May 20, 1969     H. N. BOGART     3,444,611

FRICTION WELDING METHOD

Filed Feb. 25, 1966

HAROLD N. BOGART
INVENTOR.

BY *John R. Faulkner*
*Thomas H. Oster*

ATTORNEYS

# United States Patent Office 3,444,611
Patented May 20, 1969

3,444,611
FRICTION WELDING METHOD
Harold N. Bogart, Detroit, Mich., assignor to Ford Motor Company, Dearborn, Mich., a corporation of Delaware
Filed Feb. 25, 1966, Ser. No. 530,125
Int. Cl. B23k 27/00
U.S. Cl. 29—470.3                       1 Claim

ABSTRACT OF THE DISCLOSURE

This disclosure relates to a process for securing a mild steel member to a cast iron member by friction welding and involves the flow of the steel member into an undercut in the cast iron member.

This invention relates in general to an improvement upon the recently developed process known as friction welding. This process in general involves the welding together of two metal objects by causing rapid relative rotation therebetween to heat the objects and produce a layer of molten metal at the interface. This rotation is followed by an instant cessation of movement and the continued application of pressure. This work originated in Russia and is described in a publication by V. I. Vill, dated Leningrad, 1959 and translated by the American Welding Society under the date of February 1962. This process is further described in British Patent 1,011,128 issued Nov. 24, 1965, and assigned to the American Machine & Foundry Company.

This invention furnishes a method for securely welding together two metal objects which would normally be considered difficult or impossible to weld because of the formation of an extremely brittle and hence weak layer of metal in the welding process. Metals such as gray iron, nodular iron, malleable iron and graphitic steels are typical of those metals which are extremely useful. These metals have limited welding capabilities because of the formation of an extremely hard and brittle white iron due to the quenching of the molten iron carbon alloy at the conclusion of the welding process.

The execution of this invention is illustrated by the two figures of drawing which show respectively the two metal objects prepared for and in position to weld and the two pieces after the completion of the welding operation.

The first figure of drawing illustrates typically a female member of ordinary gray cast iron which accommodates a male member which would normally be a mild steel. It will be noted that the gray cast iron member is provided with a substantial undercut. This undercut is shown to be cylindrical in form. However, this is only exemplary since the undercut can assume any convenient form. The male steel member is an ordinary soft steel rod.

Figure 1:
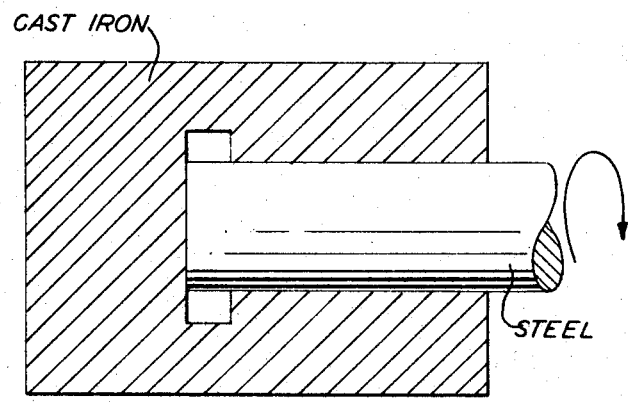

This invention has been practiced joining a three quarter inch cold rolled steel rod (SAE 1027) three quarter inch round to a cylinder of ordinary gray cast iron. The opening shown in FIGURE 1 was machined into the gray cast iron rod. The undercut in the cast iron member was one inch in diameter and five sixteenth inch long. The elongated opening in the cast iron member for the reception of the three quarter inch mild steel rod was twenty-five thirty-seconds inch in diameter.

Figure 2:
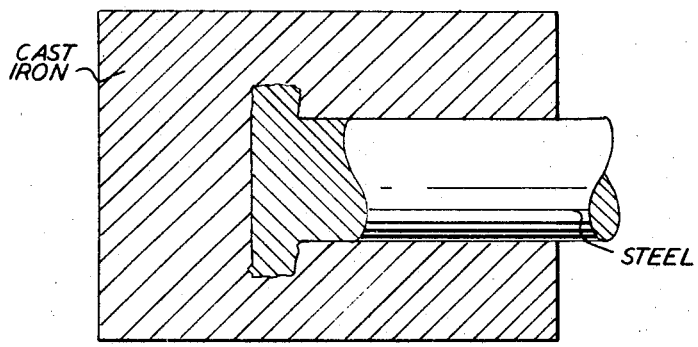

In the production of this joint the cast iron member was held stationary and the mild steel rod inserted to the entire depth possible and rotated at 2,700 r.p.m. at a pressure of 5,250 pounds for a time of 15 seconds. At the expiration of this heating period the rotation was suddenly interrupted and an upsetting pressure of 15,750 pounds was applied to complete the joint. The final joint obtained is shown in FIGURE 2 of the drawing. Joints so made between cast iron and steel were tested in tension and failed in the rod rather than in the welded joint.

To avoid the necessity of machining the cast iron female member in the production of such a joint the opening described above was formed by coring the casting rather than machining. The core process produced a somewhat harder and smoother surface and required a modification of the welding procedure. This modification involved a heating pressure of 8,750 pounds and a heating duration of twenty-five seconds as opposed to fifteen seconds. The upsetting pressure remained at 15,750 pounds and the joints were completely satisfactory.

This procedure is valuable in that it permits the fabrication of joints from metals ordinarily embrittled in the welding procedure and without the use of any extraneous inserts or welding metal.

I claim as my invention:
1. The process of securely welding together two metal objects which are normally difficult to weld because of the formation of a brittle layer during welding operations comprising forming the first of said objects with an opening therein for the reception of the second object, said opening having an undercut providing a space substantially larger than that occupied by the second object when it is inserted into the first object, inserting the second object into the first object and causing relative rotation between the first object and the second object while a heavy pressure is applied whereby a friction weld is formed between the first object and the second object and the second object is upset to fill a substantial portion of the undercut in the first object, said first object comprising hyper-eutectoid ferrous metal and said second object comprising mild steel.

References Cited

UNITED STATES PATENTS 2,447,085  8/1948  Odlum _____ 29—483
3,144,710  8/1964  Hollender et al. _____ 29—470.3

FOREIGN PATENTS 572,789  10/1945  Great Britain.

CHARLIE T. MOON, *Primary Examiner.*

D. C. REILEY, *Assistant Examiner.*

U.S. Cl. X.R.

29—479, 483